March 6, 1962 F. P. KOBERT 3,024,048
SHAFT SEAL
Filed Jan. 29, 1960 2 Sheets-Sheet 1

INVENTOR.
FRANK P. KOBERT
BY
Watts, Edgerton, Pyle, & Fisher
ATTYS.

March 6, 1962 F. P. KOBERT 3,024,048
SHAFT SEAL

Filed Jan. 29, 1960 2 Sheets-Sheet 2

INVENTOR.
FRANK P. KOBERT
BY Watts, Edgerton, Pyle, & Disher
ATTYS.

United States Patent Office 3,024,048
Patented Mar. 6, 1962

3,024,048
SHAFT SEAL
Frank P. Kobert, Cleveland, Ohio, assignor to Microtite Corporation, Cleveland, Ohio, a corporation of Ohio
Filed Jan. 29, 1960, Ser. No. 5,543
8 Claims. (Cl. 277—12)

This invention relates to sealing devices and more particularly to sealing devices adapted to seal the drive shaft entry opening in the housing.

The most common use of such seals is in the pump art, and therefore the following description of the invention will be in this environment.

At present there is a very real need and demand for a relatively inexpensive, but efficient rotating mechanical seal that has acceptably high efficiency for use in devices such as centrifugal pumps.

Therefore, one of the principal objects of this invention is to provide a relatively high efficiency rotating mechanical shaft seal.

A related object is to provide a shaft seal which is self-aligning to compensate for misalignment normal in commercial manufacturing.

A similar related object is to provide a shaft seal which is self-aligning to compensate for misalignment during normal operation.

A further related object of this invention is to provide a pump seal member which will use the fluid being pumped to exert pressure to form a positive seal against another member.

This condition is generally known as "plus factor" and is a term and condition seal engineers use and strive for, especially in more expensive, higher pressure seal designs.

Another principal object of this invention is to provide a seal with mated sealing discs having precision lapped sealing surfaces, one disc rotating with the shaft and the other non-rotative with respect to the shaft.

Another principal object of this invention is to provide a longitudinally shiftable, non-rotating sealing disc having a spring loaded ring seal follower.

Another principal object of this invention is to provide such seal structure in a form wherein a ring seal follower moves only upon a new, clean surface as wear progresses between the sealing members.

Other objects and a fuller understanding of this invention may be had by referring to the following description and claims, taken in conjunction with the accompanying drawings, in which:

Figure 1:
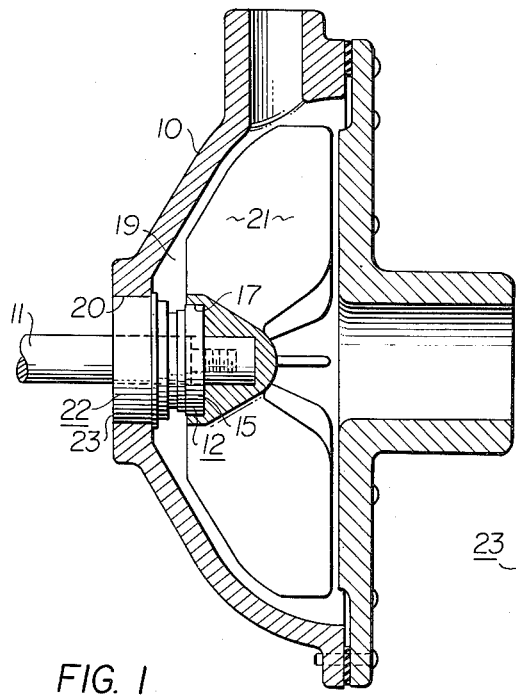
FIGURE 1 is a sectional view of a pump and shaft showing the new and improved sealing feature incorporated into a type of seal known as a cup seal.

To illustrate the invention in a typical environment, a conventional centrifugal pump is illustrated in the drawing. The pump includes a housing 10 enclosing a chamber 19. A shaft opening 20 permits a drive shaft 11 to drive an impeller 21 within the chamber 19. The problem to which this invention is directed is to seal liquid in the chamber 19 against escape through the opening 20 and around the rotating drive shaft.

The illustrated sealing device in a pump environment is comprised of two separate parts: an impeller mounted part 12, which is rotative with respect to the housing but is non-rotative with reference to the shaft; and a housing mounted part 22. A type of seal known as a shaft seal is one example wherein this condition is reversed. However, the principles of this invention are the same. The impeller has an annular sealing disc 13 non-rotatably mounted on the impeller 21 by means of a rubber cup seal 15 inserted into a recess 17 provided in the impeller for such purpose. The rubber cup 15 has a convoluted outer surface 16 which forms a press fit in the receiving recess 17; thus, relative rotational movement with respect to the impeller 21 is prevented. The sealing disc 13 has a precision lapped flat sealing face 14 defining a plane which is positioned substantially normal to the axis of the shaft 11.

The function of the housing mounted part 22 is to provide a seal between the housing 10 and the sealing disc 13 in order that a drive shaft may extend through the opening in the housing to the impeller in a sealed dry passageway. It may also be said that the seal 13 is a shaft member, and hence the part 22 seals the shaft. There are many approaches to the problem of sealing a shaft entry area into a housing. Packing glands are an example and operate by providing a close fit around the shaft itself. They occasionally need to be tightened upon the shaft to compensate for wear. This invention follows the concept of sealing an area and allowing the shaft to go through that area to its driven member. This dry area approach has been embodied in a number of flexible boot and similar type constructions.

The principle employed in this invention for the housing mounted part 22 is embodied generally in the provision of a retainer shell 23 which carries a disc 31 mated to the disc 13. The sealing of the disc carried in the retainer shell 23 is a novel arrangement which produces the sealing action in a simplified form which has proven to be extraordinarily resistant to leaking by normal use or from deterioration.

Figure 2:
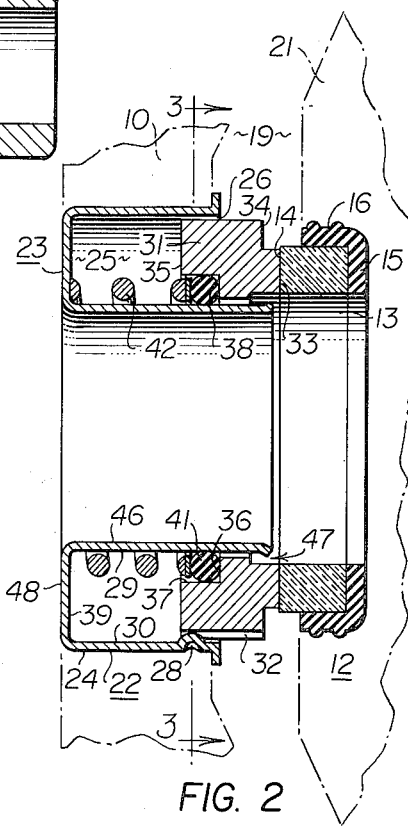
FIGURE 2 is a sectional view of the sealing device on an enlarged scale from FIGURE 1, taken along the line 2—2 of FIGURE 3.
Figure 3:
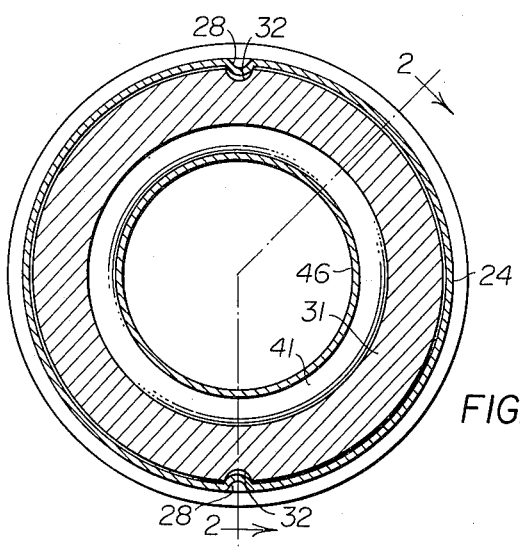
FIGURE 3 is a front sectional view of the device taken along the line 3—3 of FIGURE 2; and, FIGURE 4 is a section through the shaft and seal area of a pump, illustrating a version of a seal known as a shaft seal, and embodying the concepts of this invention.

Retainer shell 23 is non-rotatively fitted into the opening 20. This retainer shell, as best seen in FIGURE 2, is an annular cup-shaped member having a center post 46 and an exterior wall 24 and a bottom wall 48. Thus, an annular cup member of U-shaped configuration results. The annular cavity defined by this construction is indicated by the reference character 25. A first end 47, generally referred to as the "mouth" leads into the cavity 25.

For the purpose of use in describing the construction and operation, the walls defining the annular cavity 25 will be designated as an inner cavity defining surface 29, which surface is closest to the shaft 11, an outer cavity defining surface 30, which surface is closest to the housing 10, and a cavity end surface 39 which is substantially normal to both the inner cavity defining surface and the outer cavity defining surface.

The second annular sealing disc 31 is disposed in the interial cavity 25. The sealing disc 31 has a precision lapped sealing face 33 mated with the sealing face 14 of the first sealing disc 13. The sealing face 33 is oriented in the cavity 25 so that it is substantially normal to the axis of the shaft 11 and the precision lapped face 33 extends from the mouth end 47. The outer rim of the sealing disc 31 has a pair of longitudinally extending grooves 32 oppositely spaced. The casing 23 has a pair of projections 28 shaped and positioned to ride in the grooves 32. Preferably, projections 28 are dimpled from the casing, but in some instances the material of the casing will not tolerate such dimpling and separate pieces may then be welded in for such purpose. These projections emanate from the exterior wall 24. This projection and groove construction prevents rotational movement of the sealing disc 31 with respect to the casing 23, but permits it to move longitudinally in the cavity 25. The sealing disc 31 has a front pressure face 34 and a rear pressure face 35 which are parallel with each other and with the sealing face 33. The sealing disc 31 also has an annular notch 38 in the rear portion. Two wall surfaces define this notch; one surface being a first ring face 36 parallel to the rear pressure face 35, and the other a second ring face 37 normal to the first ring face. These surfaces meet at a vertex corner.

Summarizing then, the front pressure face 34, a sealing face 33, the first ring face 36 and the rear pressure face 35 are all substantially parallel to each other and all substantially normal to the axis of the shaft 11. The second ring face 37 is substantially normal to the other faces and substantially parallel with the axis of the shaft 11.

The outer rim of the sealing disc 31 is machined to have a running fit with the surface 30 with enough space between the outer rim of the disc 31 and the outer cavity surface 30 to provide a pressure communication passage 26. This allows the fluid in the chamber 19 to flow freely into the cavity 25. Therefore, there is a pressure equilibrium between the fluid in the cavity 25 and the fluid in the chamber 19.

From the description thus given, it will be clear to the observer that the problem now exists to prevent fluid, which is permitted to enter the cavity 25, from flowing out between the post wall 46 and the sealing disc 31. In shaft seals, wherein no actual fluid tight cavity is used, the post wall 46, or shroud, as it may be termed, is present and the indentical seal problem is involved. This sealing has been attempted in prior devices by using a flexible boot device extending from the back wall of the sealing disc to a wall of the cavity. Usually the boot has extended to the bottom wall 48. The approach which follows in the present invention is contrary to all advice by packing experts but has proven to be an ideal solution which has provided an absolute seal which has continued to provide absolute sealing many thousands of operative hours after all contemporary devices have failed.

The principle employed for sealing is the use of an O-ring under pressure but moving always from a contaminated area to a fresh, clean sealing area as wear takes place between the relatively movable sealing faces 33 and 13.

Manuals instructing use of O-rings as packing members on relatively movable surfaces urge that O-rings be permitted to float, but it has been found that cautions against spring loading of O-rings does not apply in the present instance because the spring loading is principally employed to move the O-ring forward by microscopic increments as wear proceeds between the sealing faces and to provide the seal condition just described. It has been found that for extreme conditions, a plurality of O-rings may be employed.

A resilient annular O-ring 41 is provided in the cavity 25 and is disposed in the notch 38. The O-ring contacts the first ring face 36 and the second ring face 37, and the inner cavity defining surface 29. A coil spring 42 is disposed in the cavity under compression, urging the O-ring into the notch 38. Thus, the O-ring forms three fluid tight seals: one with the first ring face 36, one with the second ring face 37, and one with the inner cavity defining surface 29. The coil spring 42, in addition to urging the O-ring into place forming a seal, also urges the sealing disc 31 against the sealing disc 13.

Because of the fact that fluid from the pumping cavity communicates with the casing cavity 25, there is a substantial pressure equilibrium on both sides of the longitudinally shiftable disc 31. Because the entire back area of the disc 31 is subjected to the fluid pressure, and because this area is larger than the opposed surfaces exposed to the same pressure, there is a "plus factor" pressure by the fluid being pumped urging the sealing faces to contact. The urge of the spring 42 is employed principally to keep the O-ring in tight sealing condition whenever the pump is at rest, pumping at low pressure, or during momentary pressure reversal in the pump. When at rest, there will be no fluid pressure operating to urge the disc 31 into a sealing condition, and hence the weight of the fluid would otherwise cause the disc 31 to float away from sealing engagement with the face 13 and allow leaking while the pump is idle.

Because the fit between the disc 31 and the wall 24 is not too close, a certain amount of misalignment of the disc 31 can be tolerated. This compensation is accomplished by the canting of the disc 31 within the cavity 25. Because of this ability to adjust, a fluid tight face seal can be maintained.

The illustrated type of seal in the applicant's device is a carbon-to-ceramic seal, but the principle is not confined to such a seal. It will function with any face type sealing device. Also, it is immaterial which sealing disc is carbon and which is ceramic. The selection of the material is dependent upon the particular application and other engineering features. It is a matter of choice for each application which seal will be made of which material.

The installation, application and operation of the applicant's new and improved seal is as follows. The impeller mounted part 12 is mounted so that the sealing face 14 of the disc 13 is substantially normal to the axis of the shaft 11. The rubber mounting cup 15 prevents the rotation of the disc 13 with respect to the shaft 11. The housing mounted part 22 is then mounted in the opening 20 of the housing 10. The shaft 11 extends through the hollow center post of the annular retainer shell 23. The retainer shell 23 is prevented from moving rotationally with respect to the housing 10 by any suitable means. When thus positioned, the coil spring 42 urges the sealing disc 31 against the sealing disc 13, thus forming a fluid tight face seal between the sealing face 14 and the sealing face 33. When the shaft 11 is rotated, the sealing disc 13 rotates with respect to the sealing disc 31. The two sealing faces 14 and 33 therefore are in sliding contact with each other. With the proper pressure as provided and the faces of proper flatness, a fluid type face seal is accomplished.

By the described construction of a spring loaded seal, this invention provides a unique combination of fluid pressure and spring pressure which is referred to as a "plus factor." The degree of plus factor obtained in this invention is not enjoyed by constructions which provide a sealing boot to separate the fluid from contact with the rear surfaces of the sealing disc 31.

It is a common desire of seal designers to use the fluid pressure of the pump fully around the seal back surfaces as described, but prior to this invention no successful means has been devised to apply the fluid to the full rear surfaces of the disc and still prevent the fluid from escaping under and past the disc.

One of the greatest difficulties heretofore has been that of obtaining and retaining a good seal between the reciprocally moving disc and the member carrying it (in this case the retainer shell 23 and the sealing disc 31). This new and improved device overcomes this difficulty in a very ingenious and novel manner. As the sealing faces 14 and 33 rotate against one another, they wear away. As the wearing away occurs, the coil spring 42 urges the sealing disc 31 forward, thus keeping a tight face seal. As the sealing disc 31 moves forward, the O-ring 41 also moves forward, and it moves onto a fresh portion of the inner cavity defining surface 29 that has been kept sealed from the liquid by the seal between the O-ring 41 and the inner cavity defining surface 25. Because of this clean, fresh surface, a good seal can be retained as opposed to a construction that attempts to move a seal with respect to a surface previously exposed to the pumped liquid. Experience has shown it is virtually impossible to attempt a seal on a rough, corroded surface. Thus, the novel location and use of spring pressure acting through an O-ring provides primary pressure between the rotating seal faces, allows "plus factor" pressure to be employed, and creates a forward advancing seal between a casing and an advancing seal member.

In prior constructions, in which one of the sealing discs is held against lateral movement only by the lateral stability of a pressure spring, if there should be a difference of surface hardness between the sliding seal faces, there will be a movement laterally in the direction of rotation.

By the construction according to this invention, the O-ring is confined between the retainer surface 30 and the notch surface 37, and being expanded therebetween by a compressive force reduces lateral movement to an absolute minimum. This is a desirable advantage far greater than may be appreciated at first impression by anyone other than the most experienced seal expert.

Figure 4:
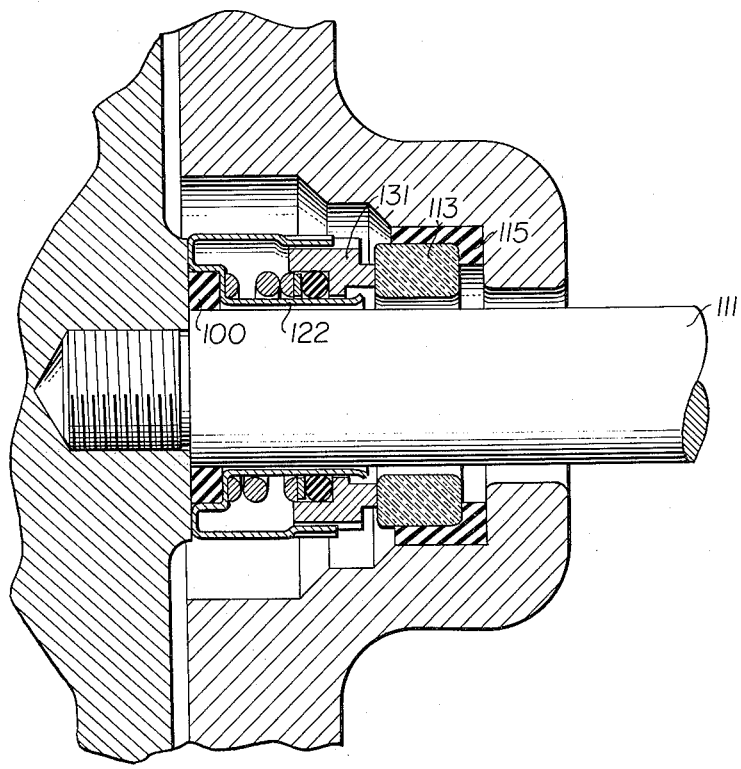

FIGURE 4 has been added to the drawings to clarify the statement that the principles of this invention may be employed in a shaft seal as well as in the cup seal of the principal description of the invention. A shaft seal is a very simple reversal in that the member 113 corresponding to member 13 of FIGURE 2 is carried by the housing in a rubber retainer 115 and is therefore a stationary member.

Also, by contrast, the shroud or shell 122 is carried non-rotatively with respect to the shaft 111 and is sealed by means of an expanded rubber packing 100. In this shaft seal construction therefore leaking past the member 113 is prevented by its sealing retainer 115. Leaking between the member 113 and the member 131 is prevented by the precision ground mating surfaces corresponding to the surfaces 33 and 14 as described with respect to FIGURE 2. Liquid allowed to enter into the interior of the shroud-shell 122 is prevented from escaping past the member 131 by the O-ring under pressure exactly as described with respect to FIGURE 2. The only other change required by this embodiment is that packing 100 is provided in order to prevent liquid from leaking between the exterior surface of shroud 122 along the rear wall thereof.

In both embodiments as best shown in FIGURES 2 and 4, the mouth end 47 of the central tubular post is flared outwardly after assembly of the disc ring, spring, and O-ring into the housing. Thus, the assembly may be stored and installed as a cartridge. In use the spacing is such that the ring or disc 31 is pressed rearwardly from the mouth 47 and hence this flare serves no purpose after the seal is placed in operation. This is believed to be novel means of assembly, and is certainly very useful.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A member of a seal device for effecting a seal between a housing having an internal chamber and a rotary shaft extending therefrom, said member comprising:
   (a) a tubular wall through which a shaft may extend;
   (b) a sealing ring having a through passageway defined by an annular wall, said annular wall closely encompassing said tubular wall;
   (c) said sealing ring having a face wall to which a face wall of a companion seal member fits for a sliding seal fit;
   (d) said sealing ring having a rear wall, with an O-ring retainer gland therein, said gland defined by a first wall extending substantially parallel and at a distance from the tubular wall, a second wall extending from the said annular wall to the first wall where they form a vertex corner;
   (e) an O-ring closely encircling said tubular wall in tight contact and in tight contact with both said first and second sealing ring gland walls, said O-ring having a normal rounded cross-section configuration with the opposed areas in contact with the gland walls and tubular wall compressed into a surface of contact and with the O-ring bridging across said vertex corner without filling the corner to thereby leave the vertex area available as expansion space in the event the O-ring becomes enlarged in service and also preventing locking of the sealing ring in position and hence assuring self-angular adjustability of the sealing ring during service;
   (f) and resilient means transmitting pressure upon said sealing ring solely through application of pressure to said O-ring;

whereby, a companion ring may be secured fluid tight to said housing and the tubular wall secured fluid tight to said shaft to effect a seal.

2. In the sealing ring structure defined in claim 1, paragraph d, said gland being a notch formed in the rear wall at the edge of the through passageway.

3. In a centrifugal pump having a housing, a rotor within said housing, a rotary drive shaft extending from said rotor through an opening in said housing, the provision of an improved seal structure for said shaft, comprising:
   (a) a cup retainer having a tubular wall through which the shaft extends, said retainer sealed fluid tight to the opening through the housing;
   (b) a sealing ring having a through passageway defined by an annular wall, said annular wall closely encompassing said tubular wall;
   (c) said sealing ring having a sealing face wall;
   (d) a sealing face wall carried by said rotor around said shaft;
   (e) said sealing face surfaces of the sealing ring and rotor being adapted to run together in a slide fit fluid tight;
   (f) said sealing ring having a rear wall with an O ring retainer gland therein, said gland defined by a first wall extending substantially parallel and at a distance from the tubular wall, a second wall extending from the said annular wall to the first wall where they form a vertex corner;
   (g) an O ring closely encircling said tubular wall in tight contact and in tight contact with both said first and second sealing ring gland walls, said O ring having a normal rounded cross-section configuration with opposed areas in contact with the gland walls and tubular wall compressed into a surface of contact and with the O ring bridging across said vertex corner without filling the corner to thereby leave the vertex area available as expansion space in the event the O ring becomes enlarged in service and also preventing locking of the sealing ring in position and hence assuring self-angular adjustability of the sealing ring during service;
   (h) and resilient means transmitting pressure upon said sealing ring solely through application of pressure to said O ring;

whereby the sealing ring is urged longitudinally along said tubuar wall into sealing contact with the sealing face surface carried by rotor and whereby the fluid pressure within the pump and spring pressure keeps the O ring compressed into position to prevent leakage between the sealing ring and the tubular wall.

4. In a centrifugal pump having a housing, a rotor within said housing, a rotary drive shaft extending from said rotor through an opening in said housing, the provision of an improved seal structure for said shaft, comprising:

(a) a cup retainer having a tubular wall through which the shaft extends, said retainer sealed fluid tight to said rotor;

(b) a sealing ring having a through passageway defined by an annular wall, said annular wall closely encompassing said tubular wall;
(c) said sealing ring having a sealing face wall;
(d) a sealing face wall carried by said housing around said opening in the housing;
(e) said sealing face surfaces of the sealing ring and rotor being adapted to run together in a slide fit fluid tight;
(f) said sealing ring having a rear wall with an O ring retainer gland therein, said gland defined by a first wall extending substantially parallel and at a distance from the tubular wall, a second wall extending from the said annular wall to the first wall where they form a vertex corner;
(g) an O ring closely encircling said tubular wall in tight contact and in tight contact with both said first and second sealing ring gland walls, said O ring having a normal rounded cross-section configuration with opposed areas in contact with the gland walls and tubular wall compressed into a surface of contact and with the O ring bridging across said vertex corner without filling the corner to thereby leave the vertex area available as expansion space in the event the O ring becomes enlarged in service and also preventing locking of the sealing ring in position and hence assuring self-angular adjustability of the sealing ring during service;
(h) and resilient means transmitting pressure upon said sealing ring solely through application of pressure to said O ring;

whereby, the sealing ring is urged longitudinally along said tubular wall into sealing contact with the sealing face surface carried by the rotor and whereby the fluid pressure within the pump and spring pressure keeps the O ring compressed into position to prevent leakage between the sealing ring and the tubular wall.

5. In combination, a pump housing, a pump device within said housing, a shaft extending from said pump device to the exterior of the housing through a shaft port, and a fluid seal at said port comprising:

(a) a tube surrounding said shaft;
(b) seal means mounting said tube stationary with respect to one said pump device and sealing against passage of fluid between the tube and the mount;
(c) a sealing ring having a through passageway encompassing said tube, said passageway defined by an annular wall of a diameter larger than the outside diameter of the said tube and only large enough to permit a slight angular relative movement with respect to said tube;
(d) the sealing ring having a seal face wall of micro-flatness;
(e) said sealing ring having a rear wall with an O-ring retainer gland therein, said gland defined by a first wall extending substantially parallel and at a distance from the tubular wall, a second wall extending from the said annular wall to the first wall where they form a vertex corner;
(f) an O-ring closely encircling said tubular wall in tight contact and in tight contact with both said first and second sealing ring gland walls, said O-ring having a normal rounded cross-section configuration with opposed areas in contact with the gland walls and tubular wall compressed into a surface of contact and with the O-ring bridging across said vertex corner without filling the corner to thereby leave the vertex area available as expansion space in the event the O-ring becomes enlarged in service and also preventing locking of the sealing ring in position and hence assuring self-angular adjustability of the sealing ring during service;
(g) resilient means transmitting pressure against said O-ring in a direction along the tube wall and against the rear ring wall;
(h) the tube enlarged in diameter on the side of the sealing ring opposite the O-ring an amount greater than the space between the sealing ring and tube to thereby permit assembly of the tube and sealing ring as a cartridge unit; and
(i) a companion sealing ring having a micro-flat face, the companion ring carried by a fluid seal in the pump device opposite that which mounts the tube, said flat faces being in contact as a seal against the passage of fluid.

6. In the structure defined in claim 5, said sealing ring having a gland notch formed at the juncture of said back wall and the through passageway to provide the first and second walls, said notch closely confining said O-ring, whereby the sealing ring is held properly aligned on the tube.

7. In combination, a pump housing, a pump device within said housing, a shaft extending from said pump device to the exterior of the housing through a shaft port, and a fluid seal at said port comprising:

(a) a cup housing having a central tube surrounding the shaft, an annular bottom wall, and an exterior side wall;
(b) the exterior side wall fitted fluid tight to said shaft port;
(c) a sealing ring having a through passageway encompassing said tube, said passageway defined by an annular wall of a diameter larger than the outside diameter of the said tube and only large enough to permit a slight angular relative movement with respect to said tube;
(d) the ring having a seal face wall of micro-flatness;
(e) said sealing ring having a rear wall with an O-ring retainer gland therein, said gland defined by a first wall extending substantially parallel and at a distance from the tubular wall, a second wall extending from the said annular wall to the first wall where they form a vertex corner;
(f) an O-ring closely encircling said tubular wall in tight contact and in tight contact with both said first and second sealing ring gland walls, said O-ring having a normal rounded cross-section configuration with opposed areas in contact with the gland walls and tubular wall compressed into a surface of contact and with the O-ring bridging across said vertex corner without filling the corner to thereby leave the vertex area available as expansion space in the event the O-ring becomes enlarged in service and also preventing locking of the sealing ring in position and hence assuring self-angular adjustability of the sealing ring during service;
(g) resilient means transmitting pressure against the said O-ring in a direction along the tube wall and against the rear ring wall;
(h) the tube enlarged in diameter on the side of the ring opposite the O-ring an amount greater than the space between the ring and tube to thereby permit assembly of the tube and ring as a cartridge unit; and
(i) a companion ring having a micro-flat face, the companion ring mounted around said shaft and sealed around its periphery to the pump device, said flat faces being in sliding contact as a seal against the passage of fluid.

8. In combination, a pump housing, a pump device within said housing, a shaft extending from said pump device to the exterior of the housing through a shaft port, and a fluid seal at said port comprising:

(a) a tube surrounding said shaft;
(b) seal means mounting said tube stationary with said shaft and sealing one end of the tube against passage of fluid between the tube and the shaft;

(c) a sealing ring having a through passageway encompassing said tube, said passageway defined by an annular wall of a diameter larger than the outside diameter of the said tube and only large enough to permit a slight angular relative movement with respect to said tube;

(d) the ring having a seal face wall of micro-flatness;

(e) said sealing ring having a rear wall with an O-ring retainer notch therein, said notch defined by a first wall extending substantially parallel and at a distance from the tubular wall, a second wall extending from the said annular wall to the first wall where they form a vertex corner;

(f) an O-ring closely encircling said tubular wall in tight contact and in tight contact with both said first and second sealing ring notch walls, said O-ring having a normal rounded cross-section configuration with opposed areas in contact with the notch walls and tubular wall compressed into a surface of contact and with the O-ring bridging across said vertex corner without filling the corner to thereby leave the vertex area available as expansion in the event the O-ring becomes enlarged in service and also preventing locking of the sealing ring in position and hence assuring self-angular adjustability of the sealing ring during service;

(g) resilient means transmitting pressure against said O-ring in a direction along the tube wall and against the rear ring wall;

(h) the tube enlarged in diameter on the side of the ring opposite the O-ring an amount greater than the space between the ring and tube to thereby permit assembly of the tube and ring as a cartridge unit; and (i) a companion ring having a micro-flat face, the companion ring mounted around said shaft and sealed around its periphery to the shaft port, said flat faces being in sliding contact as a seal against the passage of fluid.

References Cited in the file of this patent
UNITED STATES PATENTS

| | | |
|---|---|---|
| 2,393,944 | Walley | Jan. 29, 1946 |
| 2,839,317 | Haake | June 17, 1958 |
| 2,844,393 | Jensen | July 22, 1958 |